J. E. Brown,
Hames,
No 53,916. Patented Apr. 10, 1866.
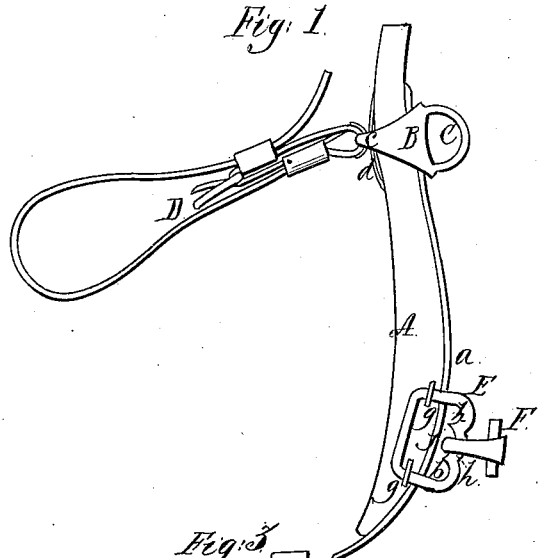
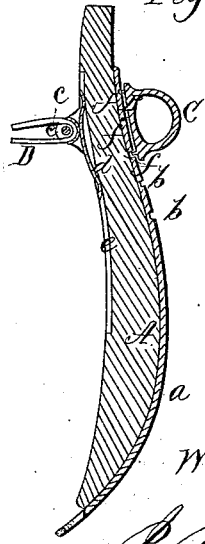
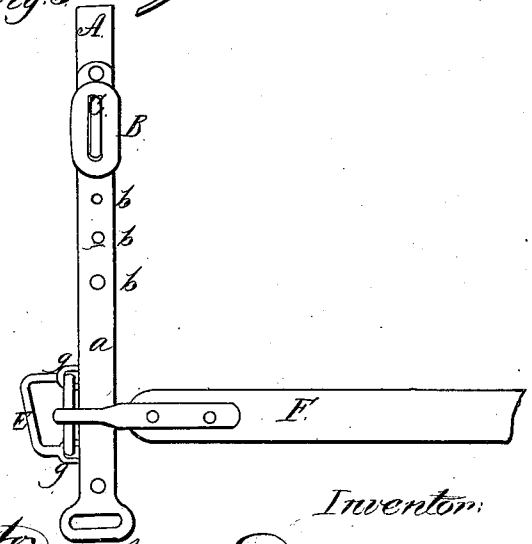
Witnesses:
Inventor:
John E. Brown

UNITED STATES PATENT OFFICE.

JOHN E. BROWN, OF LANSINGBURG, NEW YORK, ASSIGNOR TO HIMSELF, CHAS. A. MOTT, AND A. A. PEEBLES, OF SAME PLACE.

IMPROVEMENT IN HAMES FOR HORSE-COLLARS.

Specification forming part of Letters Patent No. 53,916, dated April 10, 1866.

*To all whom it may concern:*

Be it known that I, JOHN E. BROWN, of Lansingburg, in the county of Rensselaer and State of New York, have invented new and useful Improvements in Hames for Horse-Collars; and I do hereby declare that the following is a full, clear, and exact description thereof, which will enable others skilled in the art to make and use the same, reference being had to the accompanying drawings, forming a part of this specification, in which—

Figure 1 is a side view of my invention; Fig. 2, a longitudinal central section of the same; Fig. 3, an outer-edge view of the same.

Similar letters of reference indicate like parts.

This invention relates to a new and improved mode of attaching the top strap to the hames, as hereinafter fully shown and described, whereby said strap may with the greatest facility be adjusted higher or lower to suit the size of the collar to which the hames are to be attached.

The invention also relates to a new and improved mode of attaching the traces to the hames, whereby the same may readily be adjusted higher or lower to preserve a proper line of draft.

A represents one of a pair of collar-hames constructed of wood and of the usual form, and covered at its outer edge with a metal plate, a, the upper part of which is perforated with holes b, as shown in Figs. 2 and 3.

B is a metal collar, which is fitted on the upper part of the hame A, and is allowed to slide freely up and down thereon, said collar having a ring, C, at its outer side, for the rein or line to pass through, and having an eye, c, at its inner side, for the strap D, by which the upper parts of the hames are secured to the collar, to pass through. A spring, d, is placed within the collar, the ends of which are fitted in a groove, e, in the inner edge of the hame, and this spring has a tendency to keep pins f, which are in the socket at the outer edge of the hame, in the hole, b in plate a, and consequently prevent the collar B from casually sliding on the hame, the interior of the collar being sufficiently large to admit of the pins being drawn out from the holes b by pulling the collar laterally outward and the collar adjusted higher or lower on the hame, as may be desired. This will be fully understood by referring to Fig. 2. It will be seen, therefore, that the strap D, by a very simple manipulation, may be placed higher or lower, according to the size of the collar to which the hames are to be applied, the spring d always keeping the pins f of the collar in the holes b in plate a, when the collar is released by the operator.

E represents a loop of quadrangular form and bent in right-angular shape. This loop is fitted in eyes g, which are driven into the hame at its lower part. The rear side of this loop is formed with three notches or recesses, h, one above the other, and in any of these notches the eye j, which is secured to the front of the trace-strap F, is fitted. The front part of the loop E is a plain round surface, and in it one of the pole-straps is secured. When the hames are adjusted to the collar the pole-straps will keep the rear notched part of the loops close by the outer side or edge of the hames, as shown in Fig. 1, and the eye j cannot casually slip from one notch to another, and in order to adjust the eye j higher or lower the loop requires to be slipped or moved in the eyes g, so that the rear notched part of the loop may be shoved out from the hame sufficiently far to admit of the eye j of the trace-strap being adjusted in any one of the notches h. Thus by this simple means the line of draft may be regulated higher or lower, as occasion may require.

Having thus described my invention, I claim as new and desire to secure by Letters Patent—

1. The adjustable collar B, arranged with the spring d and the pins f, in combination with the holes b in the plate a at the outer edge of the hame, substantially as and for the purpose set forth.

2. The loop E, bent in right-angular form, notched at its rear or outer end, and secured to the hame by the eyes g, to admit of the eye j of the trace-strap being adjusted higher or lower in the loop, and retained as adjusted by the pole-straps, substantially as shown and described.

JOHN E. BROWN.

Witnesses:
CHAS. J. LANSING,
FRANCIS RISING.